(12) United States Patent
Eberwein et al.

(10) Patent No.: US 8,821,281 B2
(45) Date of Patent: Sep. 2, 2014

(54) DETECTION OF AN ORIENTATION OF A GAME PLAYER RELATIVE TO A SCREEN

(75) Inventors: James P. Eberwein, Raleigh, NC (US); Erik A. Kirk, Katy, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/551,126

(22) Filed: Jul. 17, 2012

(65) Prior Publication Data
US 2014/0024453 A1    Jan. 23, 2014

(51) Int. Cl.
*A63F 13/00* (2014.01)

(52) U.S. Cl.
USPC ........... 463/33; 463/1; 463/32; 463/35

(58) Field of Classification Search
CPC ........... A63F 2300/00; A63F 2300/10; A63F 2300/1012; A63F 2300/1018; A63F 2300/1062; A63F 2300/1068; A63F 2300/203; A63F 2300/205; A63F 2300/6045; A63F 2300/6063; A63F 2300/66
USPC ............. 463/35; 250/201.6, 559.31; 342/126; 356/3.01, 3.13, 3.1; 367/127
See application file for complete search history.

(56) References Cited

U.S. PATENT DOCUMENTS

| | | |
|---|---|---|
| 2008/0180395 A1 | 7/2008 | Gray |
| 2009/0141941 A1 | 6/2009 | Wagg |
| 2010/0279768 A1 | 11/2010 | Huang et al. |
| 2011/0181703 A1 | 7/2011 | Kobayashi et al. |
| 2012/0127831 A1* | 5/2012 | Gicklhorn et al. ............ 367/118 |
| 2012/0319946 A1* | 12/2012 | El Dokor et al. ............. 345/156 |
| 2013/0093625 A1* | 4/2013 | Smith ........................... 342/387 |

OTHER PUBLICATIONS

Head Tracking for Desktop VR Displays using WiiRemote Submitted by jcl5m Uploaded Dec. 21, 2007 http://www.youtube.com/watch?v=Jd3-eiid-Uw.*

Author Unknown, Xbox 360, Webpage/site: Wikipedia, the free encyclopedia, Jul. 13, 2012, pp. 1-11, Wikimedia Foundation, Inc., Published at: http://en.wikipedia.org/wiki/Xbox_360#Sales.

John Gaudiosi, Microsoft's Kinect for Xbox 360 Becomes Fastest-Selling Electronic Device in History, Webpage/site: The Hollywood Reporter, Mar. 9, 2011, pp. 1-4, The Hollywood Reporter, Published at: http://www.hollywoodreporter.com/news/microsoft-s-kinect-xbox-360-165990.

Scott Steinberg, Will Wii 2 rock the gaming world?, Webpage/site: CNN Tech, May 13, 2011, pp. 1-6, Cable News Network, Turner Broadcasting System, Inc., Published at: http://www.cnn.com/2011/TECH/gaming.gadgets/05/13/wii.2.steinberg/index.html?hpt=Sbin.

(Continued)

*Primary Examiner* — Damon Pierce
*Assistant Examiner* — Jeffrey Wong
(74) *Attorney, Agent, or Firm* — Lee Law, PLLC; Christopher B. Lee

(57) ABSTRACT

Screen plane coordinates of a plane of a game display screen relative to a location of a game sensor are determined. A location of a user relative to the location of the game sensor is determined. An orientation of the user relative to the plane of the game display screen is calculated based upon the determined screen plane coordinates of the plane of the game display screen relative to the location of the game sensor and the determined location of the user relative to the location of the game sensor.

18 Claims, 6 Drawing Sheets

(56) References Cited

OTHER PUBLICATIONS

Tyler Nagata, et al., Apple patent to usher in new generation of augmented reality shooters, Webpage/site: GamesRadar.com, Nov. 4, 2010, pp. 1-15, Future US, Inc., Published at: http://www.gamesradar.com/iphone/iphone/news/apple-patent-to-usher-in-new-generation-of-augmentedreality-shooters/a-20101110412444022081/g-201010071388669064.

* cited by examiner

DETECTION OF AN ORIENTATION OF A GAME PLAYER RELATIVE TO A SCREEN

BACKGROUND

The present invention relates to game player orientation while playing a video game. More particularly, the present invention relates to detection of an orientation of a game player relative to a screen.

Video game controllers utilize user input devices to allow user input during video game play. The user may make selections via the user input devices to cause different actions to be performed within the video game. The video game controllers may detect the user inputs via the user input devices and adjust the video game output based upon the detected user inputs.

BRIEF SUMMARY

A method includes determining, via a processor, screen plane coordinates of a plane of a game display screen relative to a location of a game sensor; determining a location of a user relative to the location of the game sensor; and calculating an orientation of the user relative to the plane of the game display screen based upon the determined screen plane coordinates of the plane of the game display screen relative to the location of the game sensor and the determined location of the user relative to the location of the game sensor.

A system includes a processor programmed to: determine screen plane coordinates of a plane of a game display screen relative to a location of a game sensor; determine a location of a user relative to the location of the game sensor; and calculate an orientation of the user relative to the plane of the game display screen based upon the determined screen plane coordinates of the plane of the game display screen relative to the location of the game sensor and the determined location of the user relative to the location of the game sensor.

A computer program product includes a computer readable storage medium including computer readable program code, where the computer readable program code when executed on a computer causes the computer to determine screen plane coordinates of a plane of a game display screen relative to a location of a game sensor; determine a location of a user relative to the location of the game sensor; and calculate an orientation of the user relative to the plane of the game display screen based upon the determined screen plane coordinates of the plane of the game display screen relative to the location of the game sensor and the determined location of the user relative to the location of the game sensor.

DETAILED DESCRIPTION

Figure 1:
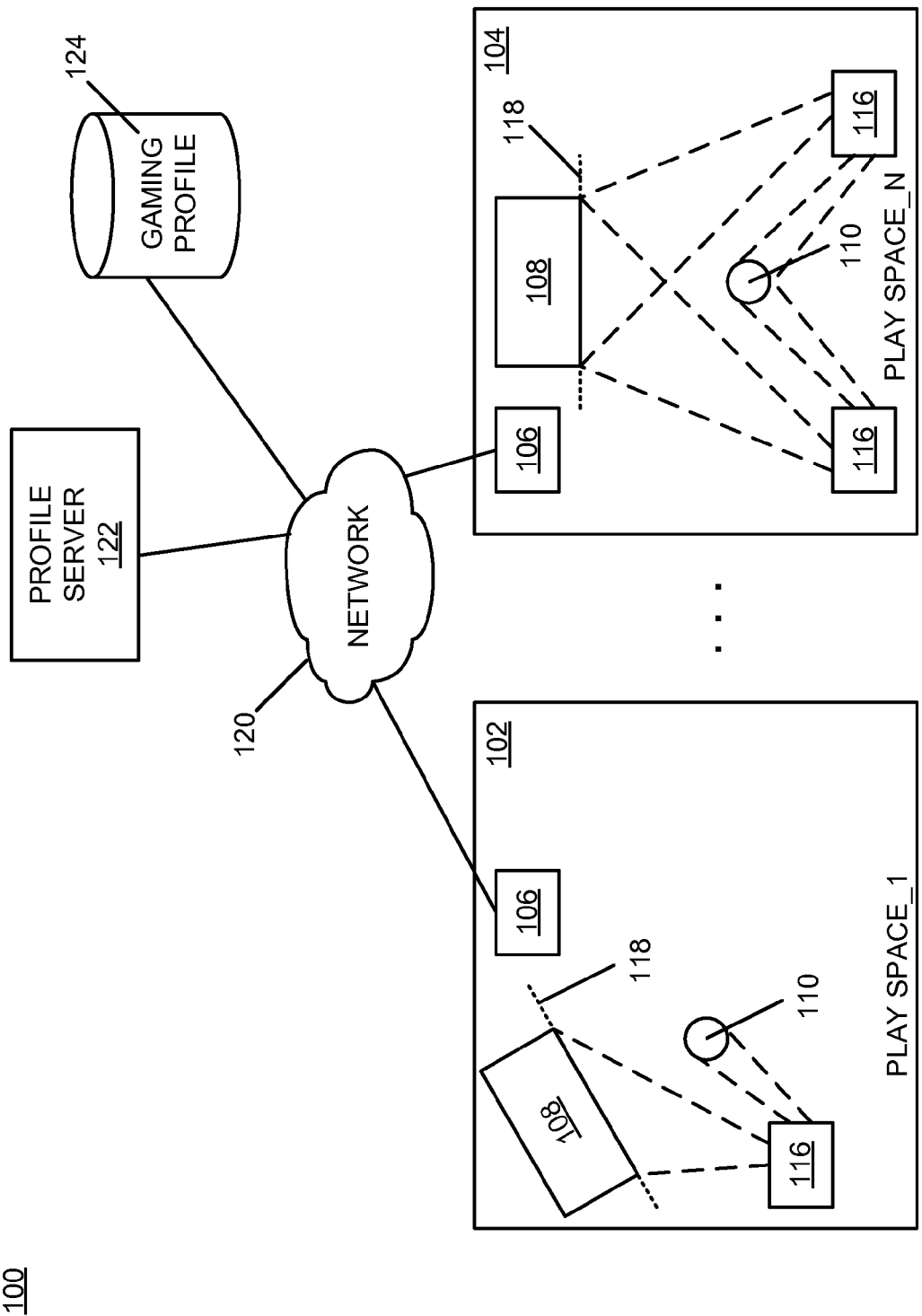
FIG. 1 is a block diagram of an example of an implementation of a system for automated detection of an orientation of a game player relative to a screen according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides detection of an orientation of a game player relative to a screen. Using the present technology, a game sensor may be placed in a player-preferred location (e.g., determined by the game player based upon architectural details of the room/game play space). The sensor's position relative to the gaming display screen is determined through configuration processing. During game play, the sensor captures user movements and location relative to the sensor. The captured user's movements and location relative to the sensor are transposed geometrically using the configured/known sensor position relative to the screen to determine/interpret the users' movements and location (e.g., the user's viewing angle) relative to the screen. As such, the angle made between the sensor's line of sight to the user and a line formed between the sensor's position and the screen are used to geometrically determine the user's position and line of sight to the screen. The user is not required to carry or play with an input device during game play.

The present technology processes inputs from one or more sensors to track the player's movements relative to the screen. Processing of a user's (e.g., game player's) position and movements for game play may be configured by determining the sensor(s)' position(s)/orientation(s) relative to the screen. The determined orientation of any sensor may include three dimensional (3D) horizontally and vertically positional coordinates and distances of the sensor relative to the screen or a portion of the screen. The determined orientation of the sensor(s) relative to the screen may then be used in conjunction with inputs from the sensor(s) to determine the player's orientation and movements relative to the screen. As such, the present technology may be utilized to better understand the play space (e.g., gaming environment) and may provide greater accuracy in interpreting the user's movements for game play and for game character functionality enhancement within gaming environments.

The sensors utilized in association with the present technology provide added functionality that facilitates determining the sensor's orientation relative to the screen. For example, the sensor's orientation relative to the screen is determined by having a set of sensor-detectable devices, such as transmitting or otherwise detectable devices, attached to the outer perimeters of the screen/housing. The sensor-detectable devices may generate audio or other forms of signals that are detectable by the sensors to determine the distance of the respective devices from the sensor(s). The sensors may detect the respective transmissions from the sensor-detectable devices to determine an orientation (e.g., distance) of the sensor relative to each such sensor-detectable device. A time difference between signal transmission generation and signal capture may be used to determine a distance to each signal source.

For purposes of the present description, it is understood that the speed of sound may be represented for purposes of calculation of time differences and distances as one thousand, one hundred, and twenty-six feet per second (1,126 ft/s) or three hundred and forty-three and two tenths meters per second (343.2 m/s) in dry air at twenty degrees Celsius (20° C.) or sixty-eight degrees Fahrenheit (68° F.). As such, using English units based upon the environmental conditions above, sound travel time per foot may be considered as 888.0995 microseconds per foot (μs/foot). Adjustments may be made as appropriate due to environmental conditions and the constant for the speed of sound may be adjusted for temperature and humidity. Calculations using measured time differences between signal transmission generation and signal capture may be multiplied by the speed of sound constant and adjusted for environmental conditions to determine the respective distance. Depending upon the distance variations for a given environment and display size (e.g., sound generation location differences) relative to game sensor placement, a timer that measures in nanoseconds or a finer resolution may be used to calculate the distances described herein.

As an alternative to housing mounted sensor-detectable devices, the user may utilize a configuration device, such as a mechanical clicker described in more detail below, as the sensor-detectable device to generate an audible signal mechanically and to also capture a time of sound generation. The user may be prompted to position the mechanical clicker at different locations in sequence to generate audible signals at different coordinate positions relative to the screen. The sensor may capture a time of audible signal reception/detection for each signal and the time difference between the audible signal generation and audible signal reception for each signal may be used to determine a distance to the mechanical clicker at different locations. The set of determined distances may be utilized to determine the screen's orientation relative to the sensor(s).

Detected transmissions from three or more such sensor-detectable devices associated with the screen or screen's housing, or the mechanical clicker, may be processed to calculate coordinates of a surface plane or curvature (that may be generalized to a planar surface) of the screen and/or screen housing relative to the sensor(s). Once oriented, the sensor(s) may track user movements (e.g., bearings and distances) relative to each respective sensor. The surface planer coordinate information may be utilized by a gaming console in conjunction with the tracked user movements to geometrically interpret the detected movements of the user relative to the sensor onto a 3D play space/environment within which the user is playing relative to the plane of the screen (e.g., relative to the center or some other point on the screen relative to the plane of the screen). As such, the present technology allows random placement of sensors. Further, regardless of whether the screen is situated on a table or other surface, mounted on a wall, or corner mounted, the present technology may provide the user with a gaming experience that is integrated into the user's actual gaming environment.

As described above and in more detail below, the sensors include two distinct functionalities. The sensors detect the screen plane/orientation relative to the sensor (and coincidentally detect sensor position relative to the screen location and plane). The sensors also detect the user's movements relative to the sensor.

Regarding detection of the screen plane/orientation relative to the sensor (and sensor position relative to the screen location and plane), this functionality may be performed, for example, using triangulation, multilateration (hyperbolic positioning), or similar methods, to determine the sensor position relative to a signal generator associated with different locations relative to the screen. For example, as described above and in more detail below, audible signal generators may be utilized to allow the sensors to determine the screen plane/orientation relative to the sensor. The sensor(s) may detect a sound pressure level from the audible signal generators and calculate the coordinates of the screen surface plane using the detected audible signals by any suitable approach.

Audible signal generators may include a mechanical clicker as described above that the user clicks at different locations and/or sound pressure levels around a screen's housing or across a screen during a configuration mode for the sensors. A mechanical clicker may be incorporated, for example, into a remote control-type device such as via a cupped material on an outside cover of a button of the remote. As such, when the user presses the cupped material to cause the mechanical click, the underlying button may also be depressed and capture the time of the audible signal generation. The button press may concurrently cause the remote to send the audible signal generation time to the sensor and signal the respective sensor(s) to detect the mechanical click.

Alternatively, an audible signal generator may also be associated with the button on the remote. The generated audible signal and signal generation time capture may be performed in conjunction with a wireless signal that sends the signal generation capture time to the sensor(s) and that causes the respective sensor(s) to detect the audible signal.

Whether a mechanical clicker or other audible signal source is used, the sensor(s) may detect each audible signal and capture a signal reception time for each audible signal. The sensor(s) may compare the captured signal reception time with the received signal generation time to determine the distance of the audible signal generator from the respective sensor for each generated signal/location. The determined distances may be utilized to determine an orientation of a plane of the screen relative to each sensor.

Where a device, such as a mechanical clicker, is located on a handheld device, such as a remote, an additional signal may be generated off of the plane of the screen and in front of the screen to orient the sensor(s) with respect to which direction the screen is facing within a room/play space. However, it should be noted that this information may be derived by use of the user's detected movements relative to the plane of the screen (e.g., if the user is located on one side of the plane of the screen, then it may be presumed that the screen is facing the user in the direction of the user).

As another alternative, audible signal generators may be integrated into the screen's housing. Each such audible signal generator may be controlled to sequentially generate an audible tone or to concurrently generate different frequency signals that may be detected by the sensor(s) during the configuration mode. The respective sensor(s) may be configured to respond to the respective frequencies of the audible signal generators or may be otherwise actuated to detect coordinates of the audible signal generators in response to the respective audible signal generations. Many other possibilities exist for detection of the screen plane relative to the sensor and any technology may be used as appropriate for a given implementation.

Regarding detection of the user's movements relative to the sensor, this functionality may also be performed using a variety of technologies. For example, user movement/motion detection may be performed using infrared (I/R) movement detection, camera-based image recognition, 3D camera technology, or otherwise as appropriate for a given implementation.

Operatively, the sensors provide these two distinct data sets to the gaming console for use during game play for calculations of the user's movements relative to the plane of the screen: a data set that captures the inter-relationship of the sensor(s) and the screen plane, and a data set that captures the inter-relationship of the sensor(s) and the user's position/movements. Averages of inputs from multiple sensors may be combined (e.g., averaged to determine movements of different extremities (e.g., arms, legs, head) of the user. Further, the present technology may be utilized to detect a user's movement relative to the plane of the screen laterally, forward, backward, leaning, sitting down on a couch, standing from a sitting position, etc. As such, multiple sensors may provide information regarding the user's orientation from multiple angles. With the information provided by the sensing technology described herein, the user movement information within the user's environment may be incorporated as gaming inputs associated with the detected movements within the user's environment to enhance 3D game play.

Game player/user gaming profiles may be utilized to capture and store information across multiple gaming sessions or game play spaces. For example, if a user often stands in a particular place when playing particular games in their home, this information may be configured in association with the user's gaming profile. As such, when in the same play space, the user's gaming profile may be accessed to initialize game play and to expedite/improve recognition of the user's movements. Additionally, when a user travels to another home/play space that has a different layout or play space environment, the user's gaming profile may be accessed to identify differences in the play space and to correlate the user's movement tendencies as captured and stored within the user's gaming profiles with differences in the user's movements within the different play space to improve movement interpretation. As such, the present technology may record the user's favorite game play positions for each game into the user's gaming profile and then allow the user to access the gaming profile from other game play environments. The present technology may also utilize the information within the user's gaming profile to make suggestions as to where the user should play within other game play environments so that the user's movements may be more accurately interpreted.

It should be noted that conception of the present subject matter resulted from recognition of certain limitations associated with game sensor positioning and detection of game player position. For example, it was observed that the game player plays relative to the screen. However, it was also observed that while some previous video game controllers utilize sensors to detect a video game player's position relative to the sensor, the sensor must be placed above, below, or next to the screen because placing the sensor in front of the screen will block the player's view of the display screen. It was further observed that, because the previous video game controllers detect a video game player's position relative to the sensor (rather than the display screen), these video game controllers do not correlate the detected position of the user relative to the display screen itself. Further, the sensor that is used by previous video game controllers does not adequately capture the user's orientation relative to the display screen of the video game. The present subject matter improves game player orientation detection relative to the display screen by providing for additional detection and orientation correlation functionality relative to the display screen, as described above and in more detail below. As such, improved game player orientation relative to the display screen and improved game player gaming experience may be obtained through the detection of an orientation of a game player relative to a screen described herein.

The detection of an orientation of a game player relative to a screen described herein may be performed in real time to allow prompt detection and correlation of the orientation of a game player relative to a screen. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated detection of an orientation of a game player relative to a screen. A play space_1 102 through a play space_N 104 represent rooms within the same or different building structures. As can be seen from FIG. 1, layout of components within the respective play spaces is different.

Each of the play space_1 102 through the play space_N 104 include a gaming controller 106 that interfaces with the television 108 for game play by a user 110. The television 108 is understood to include a housing 112 and a display screen 114 (illustrated within FIG. 3). The play space_1 102 includes a single game sensor 116. The play space_N 104 includes two game sensors 116. The game sensors 116 may be integrated into the gaming controller 106 without departure from the scope of the present subject matter.

As described above, the layout of the components within the respective play spaces is different. The game sensor(s) 116 within the respective play spaces detect an orientation (e.g., a data set of coordinates) of a display plane 118 of the display screen 114 of the television 108 relative to the game sensor(s) 116. The display plane 118 may include both vertical and horizontal angle components, such as where the television 108 is mounted at a complex angle in an upper corner of a wall near the ceiling such as in association with the play space_1 102.

The game sensor(s) 116 within the respective play spaces also detect an orientation (e.g., another data set of coordinates) of the user 110 relative to the game sensor(s) 116. As described above, with the data sets of coordinates captured for the display plane 118 and the user 110 relative to the game sensor(s) 116, a determination of an orientation (e.g., a third data set of coordinates) of the user 110 relative to the display plane 118 within the respective play spaces may be calculated. The calculation of the data set of coordinates that reflect the orientation of the user 110 relative to the display plane 118 within the respective play spaces may be performed either by the game sensor(s) 116 or by the gaming controller 106 within the respective play space. Where two or more games sensors 116 are utilized within a play space, the respective orientations of the user 110 relative to the display plane 118 from the different games sensors 116 may be combined by the gaming controller 106 to obtain a comprehensive multi-dimensional orientation of the user 110 relative to the display plane 118.

A location of the user 110 within the respective play space, movements of the user 110 during game play, and the calculated orientation of the user 110 relative to the display plane 118 during game play may be captured and tracked by the respective gaming controller 106 during one or more game play sessions. One or more of the respective gaming controllers 106 may create a user gaming profile that documents the respective data sets within the respective play spaces.

The respective gaming controllers 106 may communicate via a network 120 with a profile server 122 to store or retrieve user gaming profiles as a user, such as the user 110, moves between different play spaces. The profile server 122 may store the respective user gaming profiles within a gaming profile database 124.

As such, in response to the user 110 indicating a request to begin game play at one of the respective gaming controllers 106, the gaming controller 106 may retrieve the user's gaming profile from the profile server 122. The gaming controller 106 may also evaluate the display plane 118 within the respective play space relative to those that have been documented within the user's gaming profile. The gaming controller 106 may determine whether a similar play space layout has been documented within the user's gaming profile and if a similar play space layout has been documented, a gaming controller 106 may suggest a game play location to the user 110 within the respective play space. Further, regardless of whether the layout of components within the respective play spaces is different, data sets of user movement relative to the display plane that are retrieved from the user's gaming profile may be utilized by the gaming controller 106 to improve interpretation of the movements of the user 110 during game play, such as jumping, leaning, or other movements, to enhance game play experience for the user 110. Any additional movements, changes, or other modifications of tracked movements of the user 110 during a current game play session may be written to the user's gaming profile and sent to the profile server 122 for storage within the gaming profile database 124 for future access. As such, individualized game play experiences may be captured within the user's gaming profile and the game play experience of the user may be enhanced by use of the user's gaming profile within different play space environments.

As described above, and in more detail below, the gaming controller 106 may coordinate with one or more game sensors 116 within a given play space to configure the respective game sensors 116 or to cause the respective game sensors 116 to initiate a configuration routine to determine the display plane 118 of the television 108. For example, the gaming controller 106 may instruct the user 110 either audibly or via a screen/display of the television 108 to utilize a mechanical clicker at three or more locations relative to the display (e.g., an upper right corner, a lower right corner, and the lower left corner) sequentially. The respective game sensor(s) 116 may detect this configuration sequence and determine the display plane 118 from detected sound pressure levels and bearing (using determined distances) of the respective mechanical clicker signals. As described above, many approaches to configuring the game sensor(s) 116 to determine the display plane 118 are possible and all are within the scope of the present subject matter.

As will be described in more detail below in association with FIG. 2 through FIG. 6, the gaming controller 106 in combination with the game sensor(s) 116 within the respective play spaces, such as the play space_1 102 through the play space_N 104, provide automated detection of an orientation of a game player relative to a screen. The automated detection of an orientation of a game player relative to a screen is based upon determining a configured orientation of the display plane 118 and determination of the orientation of the user 110 within the respective play space. A determination of the orientation of the game player relative to the screen by combining and processing the respective data sets, as described above and in more detail below.

The network 120 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The profile server 122 may include any device capable of providing data for consumption by a device, such as the gaming controller 106, via a network, such as the network 120. As such, the profile server 122 may include a web server, application server, or other data server device, as appropriate for a given implementation.

Figure 2:
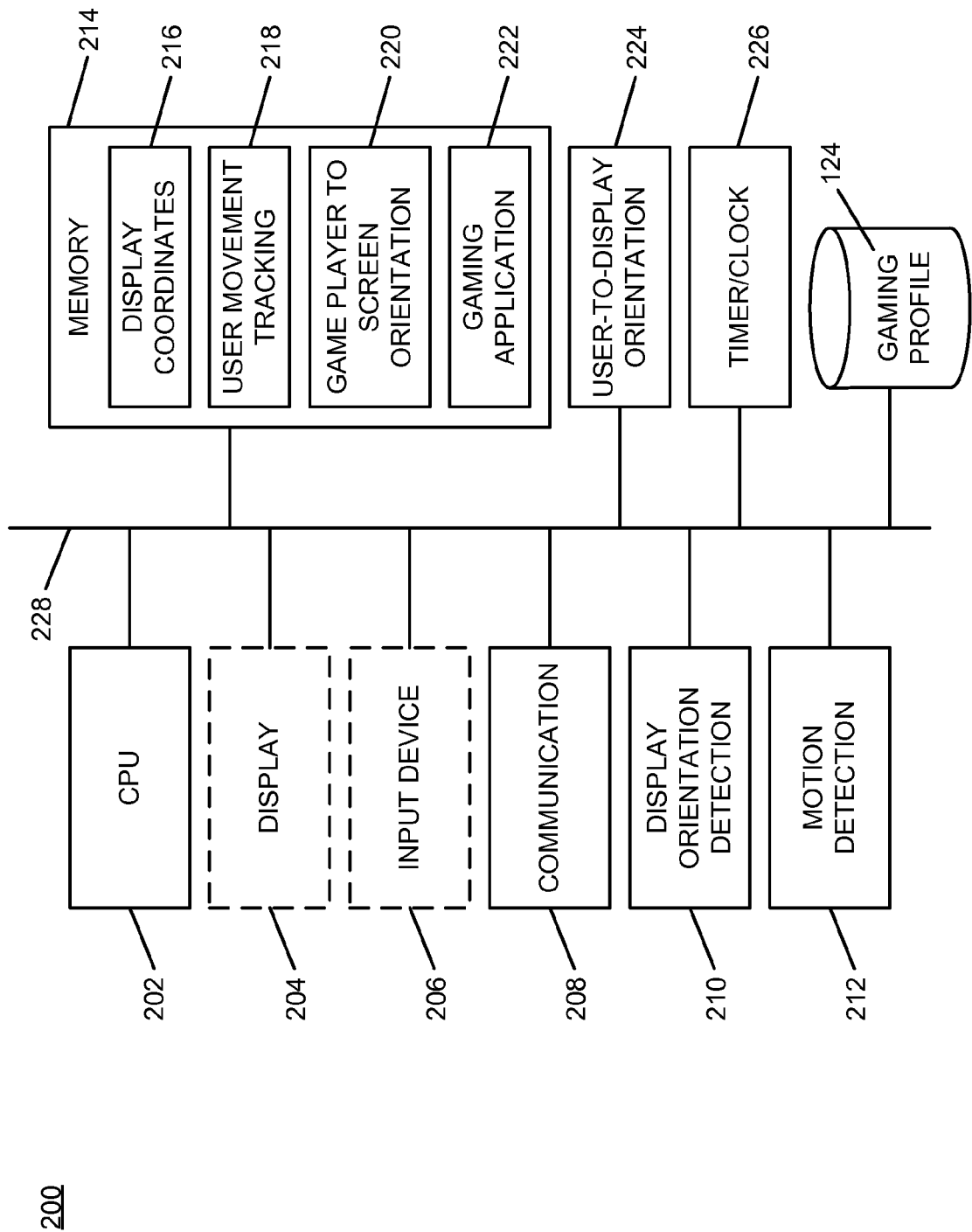
FIG. 2 is a block diagram of an example of an implementation of a core processing module capable of performing automated detection of an orientation of a game player relative to a screen according to an embodiment of the present subject matter.

FIG. 2 is a block diagram of an example of an implementation of a core processing module 200 capable of performing automated detection of an orientation of a game player relative to a screen. The core processing module 200 may be associated with the gaming controller 106, the game sensors 116, the television 108, or other device as appropriate for a given implementation. As such, the core processing module 200 is described generally herein, though it is understood that many variations on implementation of the components within the core processing module 200 are possible and all such variations are within the scope of the present subject matter. Further, in view of the variety of implementation possibilities, the core processing module 200 will be described below to include modules that may be implemented within the gaming controller 106 and/or the game sensors 116. However, it is understood that the respective modules may be partitioned into the respective gaming devices as described in association with FIG. 1 above, as appropriate for a given implementation.

Further, the core processing module 200 may provide different and complementary processing of gaming data in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204. For mechanical clicker implementations, the input device may also incorporate a button mechanically coupled to an audible clicker, and the user actuating the mechanical clicker may cause the button to generate a signal that may be captured to determine an audible signal generation time.

It should be noted that the display 204 and the input device 206 are illustrated with a dashed-line representation within FIG. 2 to indicate that they may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide the interconnection capabilities.

A display orientation detection module 210 captures display plane orientation information of a display relative to a game sensor, as described above and in more detail below, for use in determining a user's orientation relative to a display. The display orientation detection module 210 may include amplitude and bearing detection circuitry for determining a distance and direction, respectively, of an audible source utilized to configure a display plane orientation data set. As described above, a mechanical clicker or other audible source may be utilized to sequentially generate an audible signal at three or more locations relative to a display screen.

A motion detection module 212 captures user orientation relative to a game sensor, as also described above and more detail below, for use in determining the user's orientation relative to a display. The motion detection module 212 may include infrared (I/R) detection circuitry, a camera with image recognition circuitry, or other motion detection circuitry as appropriate for a given implementation.

A memory 214 includes a display coordinates storage area 216 that stores determined/captured planar orientation data associated with a display, such as data captured by the display orientation detection module 210. A user movement tracking storage area 218 stores determined/captured user orientation data, such as data captured by the motion detection module 212. A game player to screen orientation storage area 220 stores calculated data of the user relative to the determined display plane within a given play space. A gaming application 222 may utilize the game player screen orientation information stored within the game player to screen orientation storage area 220 during gameplay to better interpret the user's movements and to enhance gameplay for the user.

It is understood that the memory 214 may include any combination of volatile and non-volatile memory suitable for the intended purpose, distributed or localized as appropriate, and may include other memory segments not illustrated within the present example for ease of illustration purposes. For example, the memory 214 may include a code storage area, an operating system storage area, a code execution area, and a data area without departure from the scope of the present subject matter.

A user-to-display orientation module 224 is also illustrated. The user-to-display orientation module 224 provides analytical processing capabilities for the core processing module 200, as described above and in more detail below. The user-to-display orientation module 224 implements the automated detection of an orientation of a game player relative to a screen of the core processing module 200.

It should also be noted that the user-to-display orientation module 224 may form a portion of other circuitry described without departure from the scope of the present subject matter. Further, the user-to-display orientation module 224 may alternatively be implemented as an application stored within the memory 214. In such an implementation, the user-to-display orientation module 224 may include instructions executed by the CPU 202 for performing the functionality described herein. The CPU 202 may execute these instructions to provide the processing capabilities described above and in more detail below for the core processing module 200. The user-to-display orientation module 224 may form a portion of an interrupt service routine (ISR), a portion of an operating system, a portion of a browser application, or a portion of a separate application without departure from the scope of the present subject matter.

A timer/clock module 226 is illustrated and used to determine timing and/or date information, such as audible signal generation and detection/reception times, as described above and in more detail below. As such, the user-to-display orientation module 224 may utilize information derived from the timer/clock module 226 for information processing activities, such as the detection of an orientation of a game player relative to a screen. As described above, the timer/clock module 226 may be configured to measure time of a granularity appropriate for the given environment to be capable of differentiation between signal generation at different locations relative to a game display.

The gaming profile database 124 is also shown associated with the core processing module 200 within FIG. 2 to show that the gaming profile database 124 may be coupled to the core processing module 200. As such, the core processing module 200 may access user gaming profiles within the gaming profile database 124 without requiring external connectivity, such as via the network 120 and the profile server 122.

The CPU 202, the display 204, the input device 206, the communication module 208, the display orientation detection module 210, the motion detection module 212, the memory 214, the user-to-display orientation module 224, timer/clock module 226, and the gaming profile database 124 are interconnected via an interconnection 228. The interconnection 228 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be colocated or distributed and interconnected via a network without departure from the scope of the present subject matter. For a distributed arrangement, the display 204 and the input device 206 may be located at a display device, such as the television 108, while the CPU 202 and memory 214 may be located at a gaming console or game sensor, such as the gaming controller 106 or the game sensors 116. Many other possible arrangements for components of the core processing module 200 are possible and all are considered within the scope of the present subject matter. It should also be understood that, though the gaming profile database 124 is illustrated as a separate component, data stored within the gaming profile database 124 may also be stored within the memory 214 without departure from the scope of the present subject matter. Accordingly, the core processing module 200 may take many forms and may be associated with many platforms.

Figure 3:
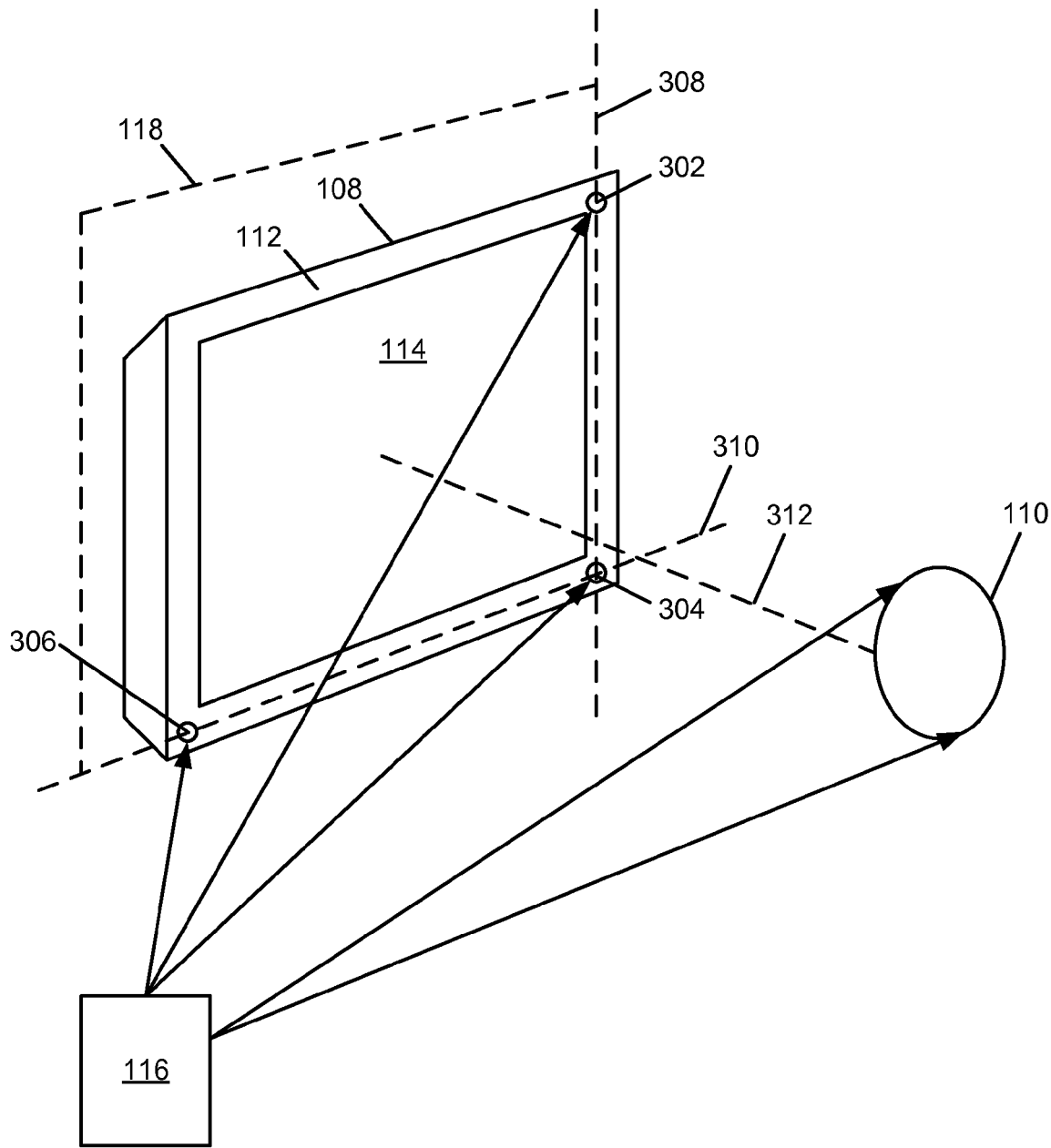
FIG. 3 is a three-dimensional diagram of an example of an implementation of a game play environment for automated detection of an orientation of a game player relative to a screen according to an embodiment of the present subject matter.

FIG. 3 is a three-dimensional diagram of an example of an implementation of a game play environment 300 for automated detection of an orientation of a game player relative to a screen. Within FIG. 3, the television 108 for game play by the user 110 and one game sensor 116 are illustrated. As described above, a signal, such as an audible signal, may be generated at each of at least three locations 302, 304, and 306 associated with the housing 112 or display screen 114 of the television 108. The audible signal may be generated by a mechanical clicker under user control at the direction of the game sensor (or gaming controller 106, not illustrated), or may be generated by multiple audible signal generators located within or in association with the housing 112 of the television 108 each at one of the locations 302, 304, and 306.

As part of configuration processing for game play, in response to generation of a signal at each of at least three locations 302, 304, and 306, the game sensor 116 detects the respective signals and determines a distance of each of the three locations 302, 304, and 306 from the game sensor 116, as described above and in more detail below. Using the determined distances of each of the locations 302, 304, and 306 from the game sensor 116, the game sensor 116 identifies a line 308 that intersects the locations 302 and the location 304 and identifies a line 310 that intersects the location 304 and the location 306. The line 308 and the line 310 intersect at the location 304 within the present example and together define the display plane 118 for purposes of the present example.

With configuration and determination of the display plane 118 completed, the game sensor 116 may detect a location of the user 110 relative to the game sensor 116. Either the game sensor 116 or the game controller 106 (not shown within the present example) may utilize a predetermined display plane 118 and the determined location of the user 110, both relative to the game sensor 116, to determine an orientation (e.g., location, position, etc.) of the user 110 relative to the determined display plane 118. Within the present example, a dashed line 312 represents a perpendicular line oriented relative to the display plane 118 between the user 110 and the television 108.

As such, utilizing the determined display plane 118 and the determined location of the user 110, both relative to the game sensor 116, the present technology facilitates random placement of the game sensor 116 within the game play environment 300 relative to the television 108 and the user 110. Further, the present technology facilitates calculation of the orientation of the user 110 relative to the determined display plane 118 based upon the random placement of the game sensor 116 within the game play environment 300. As such, improved flexibility of game sensor placement and improved detection of the orientation of a game player relative to a gaming device display screen may be achieved by use of the present subject matter.

Figure 4:
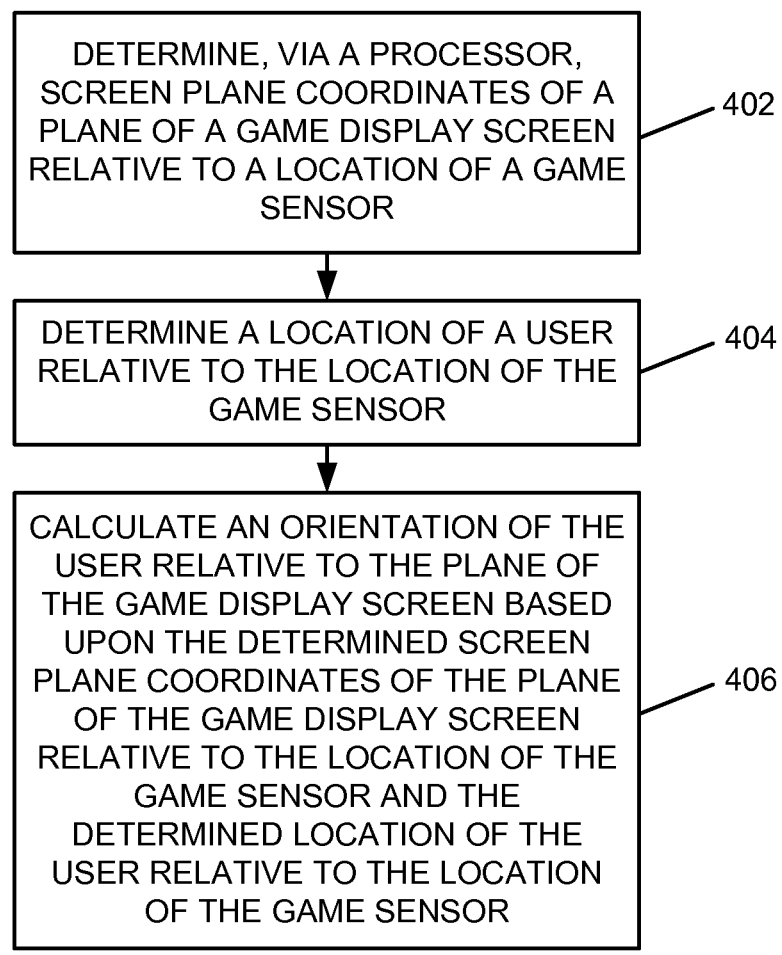
FIG. 4 is a flow chart of an example of an implementation of a process for automated detection of an orientation of a game player relative to a screen according to an embodiment of the present subject matter.
Figure 5:
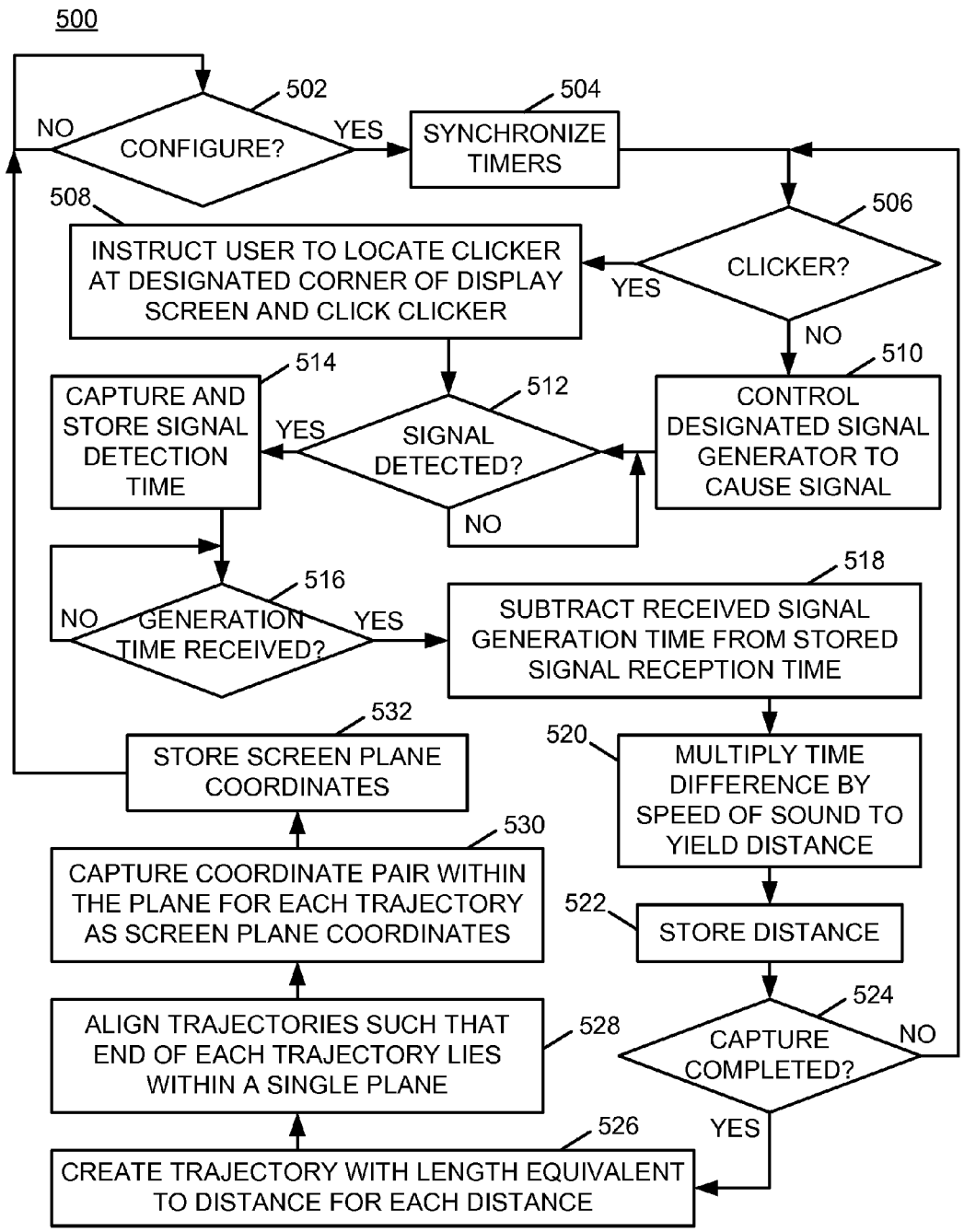
FIG. 5 is a flow chart of an example of an implementation of a process for configuration of screen plane coordinates for use in automated detection of an orientation of a game player relative to a screen according to an embodiment of the present subject matter.
Figure 6:
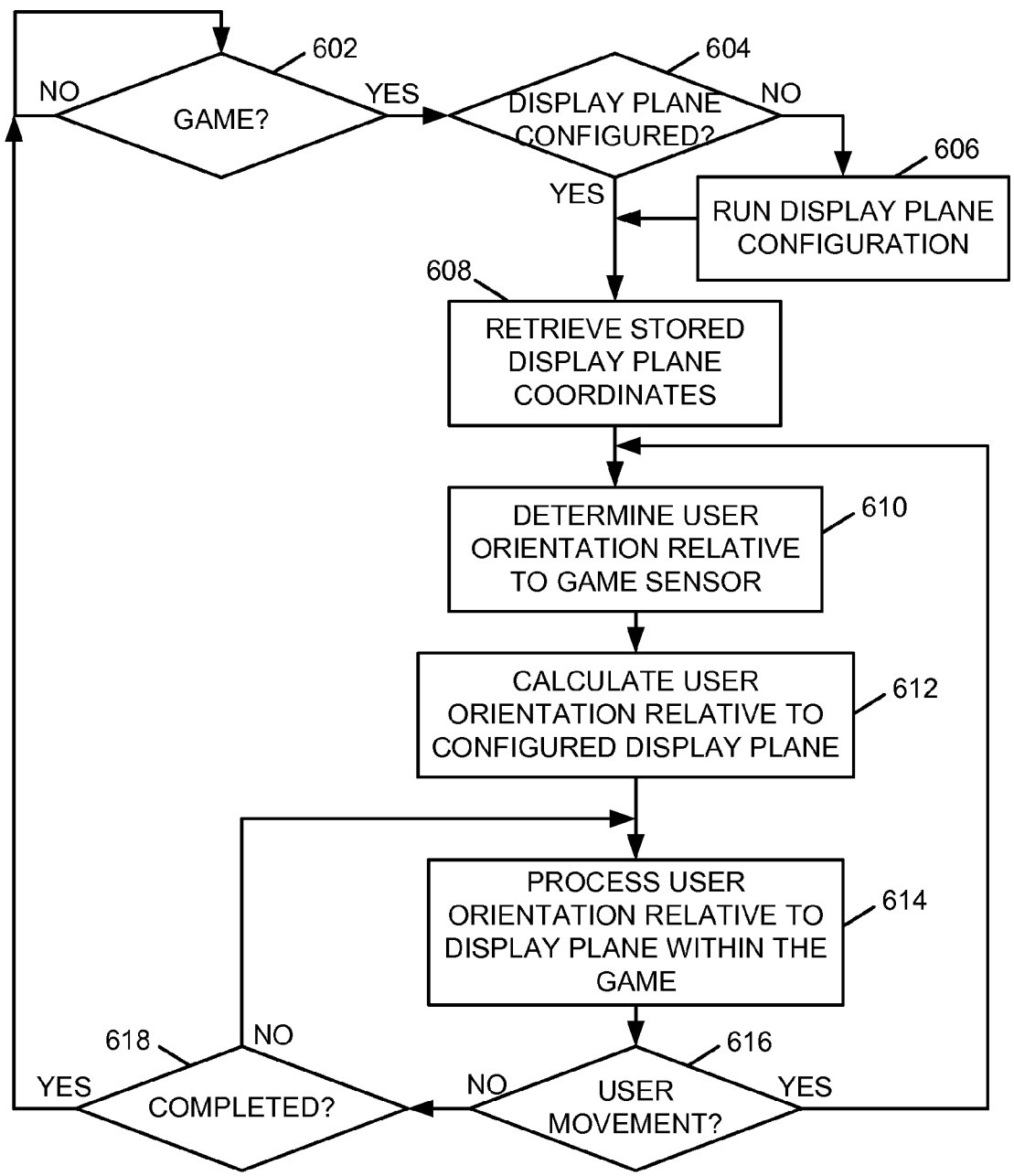
FIG. 6 is a flow chart of an example of an implementation of a process for automated detection of an orientation of a game player relative to a screen according to an embodiment of the present subject matter.

FIG. 4 through FIG. 6 described below represent example processes that may be executed by devices, such as the core processing module 200, to perform the automated detection of an orientation of a game player relative to a screen associated with the present subject matter. Many other variations on the example processes are possible and all are considered within the scope of the present subject matter. The example processes may be performed by modules, such as the user-to-display orientation module 224 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for automated detection of an orientation of a game player relative to a screen. At block 402, the process 400 determines, via a processor, screen plane coordinates of a plane of a game display screen relative to a location of a game sensor. At block 404, the process 400 determines a location of a user relative to the location of the game sensor. At block 406, the process 400 calculates an orientation of the user relative to the plane of the game display screen based upon the determined screen plane coordinates of the plane of the game display screen relative to the location of the game sensor and the determined location of the user relative to the location of the game sensor.

FIG. 5 is a flow chart of an example of an implementation of a process 500 for configuration of screen plane coordinates for use in automated detection of an orientation of a game player relative to a screen. At decision point 502, the process 500 makes a determination as to whether a request to configure screen plane coordinates for a game display has been detected. In response to determining that a request to configure screen plane coordinates for a game display has been detected, at block 504 the process 500 synchronizes timers, such as the timer/clock module 226, between one or more game sensors 116 and one or more signal generator units (e.g., mechanical clicker, etc.). Synchronization of the timers may include a coordinated reset of the respective timers to time align the respective timers for time measurement correlation and difference determination.

At decision point 506, the process 500 makes a determination as to whether a mechanical clicker is to be used by the user for audible signal generation or whether one or more signal generators are associated with a housing of the game display screen. As described above, regardless of whether a user utilizes a mechanical clicker or audible signal generators associated with a housing of the game display, audible signal generation will be performed and detected at different locations relative to the game display screen, such as three or more locations. As such, the process 500 may cause at least one audible signal generator to generate an audible signal at each of at least three locations within a two-dimensional area along the plane of the game display screen during game play configuration processing. For purposes of the present example, sequential locations may be designated and audible signals generated at those locations may be detected. The process 500 may instruct the user to sequentially generate the audible signals using a mechanical clicker at discrete game play configuration signal generation locations relative to the display screen or may sequentially control multiple audible signal generators that are each associated with a different location of a housing of the display screen to cause each of the audible signal generators to generate one audible signal at a different time.

Accordingly, in response to determining at decision point 506 that the user is to use a mechanical clicker to generate the audible signals for detection, the process 500 instructs the user to locate the clicker at a designated corner or area of the game display screen and click the clicker at block 508. As also described above, a mechanical clicker may be associated with and oriented above a signal generation time capture button on a remote controller device and the user clicking the mechanical clicker may cause the signal generation time capture button to capture the signal generation time of each generated audible signal.

Alternatively, in response to determining at decision point 506 that the user will not use a mechanical clicker to generate the audible signals for detection and that one or more signal generator(s) associated with a housing of the game display screen are to be utilized for audible signal generation, the process 500 controls the designated signal generator to cause an audible signal to be generated at block 510. Controlling the designated signal generator to cause an audible signal to be generated may include communicating with the control device associated with the designated signal generator to cause the audible signals be generated and a generation time to be captured by the respective control device.

In response to instructing the user to locate the clicker at a designated corner or area of the game display screen and click the clicker at block 508 or in response to controlling the designated signal generator to cause an audible signal to be generated at block 510, the process 500 makes a determination at decision point 512 as to whether an audible signal has been detected. In response to determining that an audible signal has been detected, the process 500 captures and stores the signal detection time of the audible signal at block 514.

At decision point 516, the process 500 makes a determination as to whether an audible signal generation time has been received from the respective signal generation device. In response to determining that the audible signal generation time has been received from the respective signal generation device, the process 500 subtracts the received signal generation time from the stored signal detection time to determine the respective time difference between the signal generation time and the signal detection time of the audible signal at block 518. At block 520, the process 500 multiplies the determined time difference by the speed of sound to determine the respective distance of the detected audible signals from the game sensor. As described above, the constant for the speed of sound may be adjusted for temperature and humidity. At block 522, the process 500 stores the determined distance from the respective audible signal source location.

At decision point 524, the process 500 makes a determination as to whether audible signal capture is completed (e.g., at least three audible signal source locations have been processed to determine distances for at least three screen plane locations). In response to determining that audible signal capture is not completed, the process 500 returns to decision point 506 and iterates as described above to calculate distances to additional signal generation locations from the game sensor. As such, the process 500 iterates to calculate a distance of each of the detected audible signals from the game sensor based upon a time difference between a signal generation time of each audible signal and a signal detection time of each audible signal.

In response to determining at decision point 524 that audible signal capture is completed, the process 500 creates for each determined distance of each of the detected audible signals from the game sensor, a three-dimensional trajectory with a length equivalent to the determined distance from the game sensor associated with the location from which the respective audible signal was generated at block 526. At block 528, the process 500 aligns the three-dimensional trajectories such that an end of each trajectory lies within a single plane. At block 530, the process 500 captures a coordinate pair of the end of each trajectory within the single plane as the screen plane coordinates of the plane of the game display screen. As such, the process 500 calculates each screen plane coordinate of the plane of the game display using one of the calculated distances of the detected audible signals. At block 532, the process 500 stores the calculated screen plane coordinates and returns to decision point 502 and iterates as described above.

As such, the process 500 performs configuration processing to synchronize timers between audible signal generators and a game controller and sequentially causes the audible signal generator to generate an audible signal at each of at least three locations within a two-dimensional area along the plane of the game display screen during game play configuration processing. The process 500 detects each of the audible signals generated at each of the at least three locations within the two-dimensional area along the plane of the game display and calculates a distance to each detected audible signal. The process 500 further calculates screen plane coordinates of the plane of the game display screen using the calculated distances to configure the plane of the game displayed for game play processing.

FIG. 6 is a flow chart of an example of an implementation of a process 600 for automated detection of an orientation of a game player relative to a screen. At decision point 602, the process 600 makes a determination as to whether game play has been initiated by a user. In response to determining that game play has been initiated by a user, the process 600 makes a determination at decision point 604 as to whether the display plane has already been configured for game play. In response to determining that the display plane has not been configured for game play, the process 600 runs display plane configuration processing at block 606, such as that described above in association with FIG. 5. In response to completion of the display plane configuration processing at block 606, or in response to determining that the display plane has already been configured for game play at decision point 604, the process 600 retrieves stored display plane coordinates at block 608.

At block 610, the process 600 determines the user orientation relative to the game sensor. At block 612, the process 600 calculates an orientation of the user relative to the configured plane of the game display screen based upon the determined screen plane coordinates of the plane of the game display screen relative to the location of a game sensor and the determined location of the user relative to the location of the game sensor. At block 614, the process 600 processes the calculated user orientation relative to the display plane within the game (e.g., as one or more game inputs).

At decision point 616, the process 600 makes a determination as to whether a user movement has been detected. In response to determining that a user movement has not been detected, process 600 makes a determination at decision point 618 as to whether game play has been completed. In response to determining that game play has not been completed, the process 600 returns to block 614 to further process game play with the current user orientation relative to the display plane.

In response to determining at decision point 616 that a user movement has been detected, the process 600 returns to block 610 to again determine the user orientation relative to the game sensor and calculate user orientation relative to the configured display plane at block 612. The process 600 iterates as described above until a determination is made at decision point 618 that game play is completed. In response to determining at decision point 618 that game play is completed, the process 600 returns to decision point 602 and iterates as described above.

As such, the process 600 either utilizes previously configured game display screen plane coordinates or configures the game display screen plane coordinates. The process 600 determines an initial orientation of the user relative to the configured display plane and processes the initial orientation as one or more game inputs. In response to detecting movements of the user during game play, the process 600 performs at least one additional calculation of the orientation of the user relative to the plane of the game display and processes each additional calculation of the orientation of the user relative to the plane of the game display to control game functionality.

As described above in association with FIG. 1 through FIG. 6, the example systems and processes provide detection of an orientation of a game player relative to a screen. Many other variations and additional activities associated with detection of an orientation of a game player relative to a screen are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   determining, via a processor, screen plane coordinates that define a planar orientation of a game display screen relative to a location of a game sensor, where the game sensor is located outside of an area between a user and the game display screen, comprising:
   causing at least one audible signal generator to generate an audible signal at each of at least three locations within a two-dimensional area along a plane of the game display screen during game play configuration processing;
   detecting each of the audible signals generated at each of the at least three locations within the two-dimensional area along the plane of the game display screen;
   calculating a distance of each of the detected audible signals from the game sensor based upon a time difference between a signal generation time of each audible signal and a signal detection time of each audible signal;
   calculating each screen plane coordinate that defines the planar orientation of the game display screen using one of the calculated distances of the detected audible signals;
   identifying two intersecting lines that each pass through two of the calculated screen plane coordinates; and
   defining the planar orientation of the game display screen as a plane created by the two intersecting lines relative to the location of the game sensor;
   determining a location of the user relative to the location of the game sensor; and
   calculating an orientation of the user relative to the planar orientation of the game display screen based upon the determined screen plane coordinates that define the planar orientation of the game display screen relative to the location of the game sensor and the determined location of the user relative to the location of the game sensor.

2. The method of claim 1, where causing the at least one audible signal generator to generate the audible signal at each of the at least three locations within the two-dimensional area along the plane of the game display screen during game play configuration processing comprises one of:
   instructing the user to sequentially generate the audible signal using a mechanical clicker at discrete game play configuration signal generation locations relative to the game display screen; and
   sequentially controlling a plurality of audible signal generators that are each associated with a different location of a housing of the game display screen to cause each of the plurality of audible signal generators to generate one audible signal at a different time.

3. The method of claim 2, where the mechanical clicker is oriented relative to a signal generation time capture button on a remote controller device and the user clicking the mechanical clicker causes the signal generation time capture button to capture the signal generation time of each generated audible signal.

4. The method of claim 1, further comprising:
   storing a signal detection time associated with the detection of each of the audible signals;
   receiving the signal generation time of each of the audible signals generated by the at least one audible signal generator; and where calculating the distance of each of the detected audible signals from the game sensor based upon the time difference between the signal generation time of each audible signal and the signal detection time of each audible signal comprises:
for each detected audible signal:
subtracting the received signal generation time from the stored signal detection time to determine the respective time difference between the signal generation time and the signal detection time of each audible signal; and
multiplying each determined time difference by the speed of sound to determine the respective distance of each of the detected audible signals from the game sensor.

5. The method of claim 1, where calculating each screen plane coordinate that defines the planar orientation of the game display screen using one of the calculated distances of the detected audible signals comprises:
creating, for each calculated distance of each of the detected audible signals from the game sensor, a three-dimensional (3D) trajectory with a length equivalent to the determined distance from the game sensor associated with the location from which the audible signal was generated;
where identifying the two intersecting lines that each pass through two of the calculated screen plane coordinates comprises:
aligning the 3D trajectories such that an end of each 3D trajectory lies within a single plane; and
forming, for each pairing of 3D trajectories, a line within the single plane that passes through the end of each of the 3D trajectories of the pairing, where the two intersecting lines intersect at the end of one of the 3D trajectories; and
where defining the planar orientation of the game display screen as the plane created by the two intersecting lines relative to the location of the game sensor comprises:
capturing a coordinate pair of the end of each 3D trajectory within the single plane as the screen plane coordinates that define the planar orientation of the game display screen.

6. The method of claim 1, further comprising:
performing, in response to detecting at least one movement of the user during game play, at least one additional calculation of the orientation of the user relative to the planar orientation of the game display screen; and
processing each additional calculation of the orientation of the user relative to the planar orientation of the game display screen to control game functionality.

7. A system, comprising:
a processor programmed to:
determine screen plane coordinates that define a planar orientation of a game display screen relative to a location of a game sensor, where the game sensor is located outside of an area between a user and the game display screen, comprising being programmed to:
cause at least one audible signal generator to generate an audible signal at each of at least three locations within a two-dimensional area along a plane of the game display screen during game play configuration processing;
detect each of the audible signals generated at each of the at least three locations within the two-dimensional area along the plane of the game display screen;
calculate a distance of each of the detected audible signals from the game sensor based upon a time difference between a signal generation time of each audible signal and a signal detection time of each audible signal;
calculate each screen plane coordinate that defines the planar orientation of the game display screen using one of the calculated distances of the detected audible signals;
identify two intersecting lines that each pass through two of the calculated screen plane coordinates; and
define the planar orientation of the game display screen as a plane created by the two intersecting lines relative to the location of the game sensor;
determine a location of the user relative to the location of the game sensor; and
calculate an orientation of the user relative to the planar orientation of the game display screen based upon the determined screen plane coordinates that define the planar orientation of the game display screen relative to the location of the game sensor and the determined location of the user relative to the location of the game sensor.

8. The system of claim 7, where, in being programmed to cause the at least one audible signal generator to generate the audible signal at each of the at least three locations within the two-dimensional area along the plane of the game display screen during game play configuration processing, the processor is programmed to one of:
instruct the user to sequentially generate the audible signal using a mechanical clicker at discrete game play configuration signal generation locations relative to the game display screen; and
sequentially control a plurality of audible signal generators that are each associated with a different location of a housing of the game display screen to cause each of the plurality of audible signal generators to generate one audible signal at a different time.

9. The system of claim 8, where the mechanical clicker is oriented relative to a signal generation time capture button on a remote controller device and the user clicking the mechanical clicker causes the signal generation time capture button to capture the signal generation time of each generated audible signal.

10. The system of claim 7, further comprising a memory and where the processor is further programmed to:
store a signal detection time associated with the detection of each of the audible signals in the memory;
receive the signal generation time of each of the audible signals generated by the at least one audible signal generator; and
where, in being programmed to calculate the distance of each of the detected audible signals from the game sensor based upon the time difference between the signal generation time of each audible signal and the signal detection time of each audible signal, the processor is programmed to:
for each detected audible signal:
subtract the received signal generation time from the stored signal detection time to determine the respective time difference between the signal generation time and the signal detection time of each audible signal; and
multiply each determined time difference by the speed of sound to determine the respective distance of each of the detected audible signals from the game sensor.

11. The system of claim 7, where, in being programmed to calculate each screen plane coordinate that defines the planar orientation of the game display screen using one of the calculated distances of the detected audible signals, the processor is programmed to:
   create, for each calculated distance of each of the detected audible signals from the game sensor, a three-dimensional (3D) trajectory with a length equivalent to the determined distance from the game sensor associated with the location from which the audible signal was generated;
   where, in being programmed to identify the two intersecting lines that each pass through two of the calculated screen plane coordinates, the processor is programmed to:
      align the 3D trajectories such that an end of each 3D trajectory lies within a single plane; and
      form, for each pairing of 3D trajectories, a line within the single plane that passes through the end of each of the 3D trajectories of the pairing, where the two intersecting lines intersect at the end of one of the 3D trajectories; and
   where, in being programmed to define the planar orientation of the game display screen as the plane created by the two intersecting lines relative to the location of the game sensor, the processor is programmed to:
      capture a coordinate pair of the end of each 3D trajectory within the single plane as the screen plane coordinates that define the planar orientation of the game display screen.

12. The system of claim 7, where the processor is further programmed to:
   perform, in response to detecting at least one movement of the user during game play, at least one additional calculation of the orientation of the user relative to the planar orientation of the game display screen; and
   process each additional calculation of the orientation of the user relative to the planar orientation of the game display screen to control game functionality.

13. A computer program product comprising a non-transitory computer readable storage medium including computer readable program code, where the computer readable program code when executed on a computer causes the computer to:
   determine screen plane coordinates that define a planar orientation of a game display screen relative to a location of a game sensor, where the game sensor is located outside of an area between a user and the game display screen, comprising causing the computer to:
      cause at least one audible signal generator to generate an audible signal at each of at least three locations within a two-dimensional area along a plane of the game display screen during game play configuration processing;
      detect each of the audible signals generated at each of the at least three locations within the two-dimensional area along the plane of the game display screen;
      calculate a distance of each of the detected audible signals from the game sensor based upon a time difference between a signal generation time of each audible signal and a signal detection time of each audible signal;
      calculate each screen plane coordinate that defines the planar orientation of the game display screen using one of the calculated distances of the detected audible signals;
      identify two intersecting lines that each pass through two of the calculated screen plane coordinates; and
      define the planar orientation of the game display screen as a plane created by the two intersecting lines relative to the location of the game sensor;
   determine a location of the user relative to the location of the game sensor; and
   calculate an orientation of the user relative to the planar orientation of the game display screen based upon the determined screen plane coordinates that define the planar orientation of the game display screen relative to the location of the game sensor and the determined location of the user relative to the location of the game sensor.

14. The computer program product of claim 13, where, in causing the computer to cause the at least one audible signal generator to generate the audible signal at each of the at least three locations within the two-dimensional area along the plane of the game display screen during game play configuration processing, the computer readable program code when executed on the computer causes the computer to one of:
   instruct the user to sequentially generate the audible signal using a mechanical clicker at discrete game play configuration signal generation locations relative to the game display screen; and
   sequentially control a plurality of audible signal generators that are each associated with a different location of a housing of the game display screen to cause each of the plurality of audible signal generators to generate one audible signal at a different time.

15. The computer program product of claim 14, where the mechanical clicker is oriented relative to a signal generation time capture button on a remote controller device and the user clicking the mechanical clicker causes the signal generation time capture button to capture the signal generation time of each generated audible signal.

16. The computer program product of claim 13, where the computer readable program code when executed on the computer further causes the computer to:
   store a signal detection time associated with the detection of each of the audible signals;
   receive the signal generation time of each of the audible signals generated by the at least one audible signal generator; and
   where, in causing the computer to calculate the distance of each of the detected audible signals from the game sensor based upon the time difference between the signal generation time of each audible signal and the signal detection time of each audible signal, the computer readable program code when executed on the computer causes the computer to:
      for each detected audible signal:
         subtract the received signal generation time from the stored signal detection time to determine the respective time difference between the signal generation time and the signal detection time of each audible signal; and
         multiply each determined time difference by the speed of sound to determine the respective distance of each of the detected audible signals from the game sensor.

17. The computer program product of claim 13, where, in causing the computer to calculate each screen plane coordinate that defines the planar orientation of the game display screen using one of the calculated distances of the detected audible signals, the computer readable program code when executed on the computer causes the computer to:

create, for each calculated distance of each of the detected audible signals from the game sensor, a three-dimensional (3D) trajectory with a length equivalent to the determined distance from the game sensor associated with the location from which the audible signal was generated;

where, in causing the computer to identify the two intersecting lines that each pass through two of the calculated screen plane coordinates, the computer readable program code when executed on the computer causes the computer to:

align the 3D trajectories such that an end of each 3D trajectory lies within a single plane; and form, for each pairing of 3D trajectories, a line within the single plane that passes through the end of each of the 3D trajectories of the pairing, where the two intersecting lines intersect at the end of one of the 3D trajectories; and where, in causing the computer to define the planar orientation of the game display screen as the plane created by the two intersecting lines relative to the location of the game sensor, the computer readable program code when executed on the computer causes the computer to:

capture a coordinate pair of the end of each 3D trajectory within the single plane as the screen plane coordinates that define the planar orientation of the game display screen.

18. The computer program product of claim 13, where the computer readable program code when executed on the computer further causes the computer to:

perform, in response to detecting at least one movement of the user during game play, at least one additional calculation of the orientation of the user relative to the planar orientation of the game display screen; and process each additional calculation of the orientation of the user relative to the planar orientation of the game display screen to control game functionality.

* * * * *